United States Patent [19]

Oguro

[11] Patent Number: 5,477,276
[45] Date of Patent: Dec. 19, 1995

[54] DIGITAL SIGNAL PROCESSING APPARATUS FOR ACHIEVING FADE-IN AND FADE-OUT EFFECTS ON DIGITAL VIDEO SIGNALS

[75] Inventor: Masaki Oguro, Tokyo, Japan

[73] Assignee: Sony Corporation, Tokyo, Japan

[21] Appl. No.: 165,860

[22] Filed: Dec. 14, 1993

[30] Foreign Application Priority Data

Dec. 17, 1992 [JP] Japan ................................... 4-337213
Dec. 22, 1992 [JP] Japan ................................... 4-342450

[51] Int. Cl.⁶ .................................................. H04N 9/74
[52] U.S. Cl. ......................................... 348/595; 348/593
[58] Field of Search ................................. 348/593, 595,
348/528, 403, 395; H04N 9/74

[56] References Cited

U.S. PATENT DOCUMENTS

| 4,635,112 | 1/1987 | Tomioka et al. | |
|---|---|---|---|
| 4,947,251 | 8/1990 | Hentschel | 348/910 |
| 5,245,436 | 9/1993 | Alattar | 348/595 |
| 5,287,187 | 2/1994 | Sato et al. | 348/595 |
| 5,351,083 | 9/1994 | Tsukagoshi | 348/403 |
| 5,355,173 | 10/1994 | Fujita | 348/593 X |

FOREIGN PATENT DOCUMENTS

| 0346636 | 12/1989 | European Pat. Off. |
| 0432048 | 6/1991 | European Pat. Off. |
| 0454556 | 10/1991 | European Pat. Off. |
| 0493128 | 7/1992 | European Pat. Off. |
| 0506435 | 9/1992 | European Pat. Off. |
| 0582122 | 2/1994 | European Pat. Off. |

OTHER PUBLICATIONS

Patent Abstracts Of Japan vol. 16, No. 340 (E-1238) 23 Jul. 1992 & JP-A-04 103 271 (Nippon Hoso Kyokai) 6 Apr. 1992.

Patent Abstracts Of Japan vol. 14, No. 51 (E-881) 30 Jan. 1990 & JP-A-01 278 183 (Canon Inc.) 8 Nov. 1989.

Patent Abstracts of Japan vol. 16, No. 344 (E-1239) 24 Jul. 1992 & JP-A-04 105 475 (Canon Inc.) 7 Apr. 1992.

Primary Examiner—Victor R. Kostak
Attorney, Agent, or Firm—William S. Frommer; Alvin Sinderbrand

[57] ABSTRACT

Digital signal processing apparatus in which compressed frequency components of a digital signal are processed to selectively achieve fade-in, fade-out and scene change effects and where the digital signal is scrambled (and subsequently descrambled) in whole or in by part scrambling (or descrambling) selected compressed frequency components of the digital signal.

15 Claims, 9 Drawing Sheets

DIGITAL SIGNAL PROCESSING APPARATUS FOR ACHIEVING FADE-IN AND FADE-OUT EFFECTS ON DIGITAL VIDEO SIGNALS

BACKGROUND OF THE INVENTION

The present invention relates to a digital signal processing apparatus, and more particularly, to apparatus for processing compressed frequency components of a digital image signal to provide fade-in, fade-out and scene-change effects and further, to provide scrambling and descrambling of the digital image signal.

Audio-video equipment, such as a consumer VTR (video tape recorder) having a built-in camera (i.e. a camcorder), permit fade-in or fade-out of a video image during a scene change or the like. During this fade-in or fade-out operation, it is known to utilize a white fade for a white fade in/out and to utilize a black fade for a black fade in/out or the like.

FIG. 9 illustrates one example of an arrangement of a conventional fade-in and fade-out circuit. As shown in FIG. 9, a composite video signal is supplied to an input terminal 101. Since it is common that the composite video signal be transmitted at 75 ohms and 1 Vp-p (peak to peak), the composite video signal is terminated by a terminating resistor 102 of 75 ohms and received by a buffer 103. An output from the buffer 103 is supplied through a capacitor 104 to a clamper 105. The clamper 105 is adapted to prevent a DC component of the pedestal level of the video signal from becoming unstable. The output of clamper 105 is supplied to a Y/C separating circuit 106 and a synchronizing separating circuit 107. The synchronizing separating circuit 107 extracts from the composite video signal a composite sync. signal from which a horizontal (H) sync. signal and a vertical (V) sync. signal are synthesized. The Y/C separating circuit 106 separates the composite video signal to provide a luminance signal Y and a chrominance signal C which are supplied to buffers 108, 109, respectively.

Typically the fade-in and fade-out operations are carried out by varying the resistance values of three variable resistors. Variable resistors 111 and 112 pass, or attenuate, the luminance signal Y and the chrominance signal C, respectively, thereby adjusting the levels of these signals. Another variable resistor 110 connects a power source voltage Vcc to a mixer 113, thus applying a DC voltage to the mixer. This voltage is referred to as a set-up voltage.

Normally, during a non-fade in or fade-out operation, the resistance value of variable resistor 110 is set to its maximum value and the resistance values of variable resistors 111, 112 are set to zero (short circuit) such that luminance signal Y passes through variable resistor 111, mixer 113 and buffer 114 and chrominance signal C passes through variable resistor 112 and buffer 115, whereby the original composite video signal is re-synthesized by mixer 116 and the output thereof is supplied to a buffer 118 through a switch 117. During a composite sync. period, switch 117 supplies the output of synchronizing separating circuit 107 to buffer 118. The output of buffer 118 is supplied to output terminal 120 through an impedance matching resistor 119.

The fade-out operation of the fade in/fade out circuit of FIG. 9 will now be described. The resistance values of variable resistors 111, 112 are progressively increased in response to a white fade-out command and simultaneously, the resistance value of variable resistor 110 is progressively decreased. When the resistance values of variable resistors 111, 112 are at their maximum and the resistance value of variable resistor 110 is at its minimum, luminance signal Y supplied to buffer 114 is held at the white level. A white fade-in operation is carried out by merely performing the reverse of the above described fade-out operation.

A black fade-out operation is performed when the resistance value of variable resistor 110 is set to its maximum value for the entire aforesaid fade-out operation. The black fade-in operation is the reverse operation of the black fade-out operation.

Satellite broadcasting companies and cable television companies which transmit scrambled video and audio signals via satellite or cable have long been commercially available. Television viewers cannot watch or listen to broadcast video and audio signals unless the broadcast signals are de-scrambled. In this instance, television viewers cannot enjoy picture and sound of such broadcasting unless a descrambler, leased by the broadcaster to the television viewer, descrambles the signal prior to its receipt by the television receiver. However, if video and audio signals are scrambled in such a fashion that the picture and sound are completely unrecognizable by the user, there is the risk that the user misunderstands this condition to be a malfunction of the TV receiver. But, if the user is able to recognize to some extent the sound accompanying the scrambled picture being broadcasted then the user may be interested in becoming a subscriber to that broadcast station. For this reason, video and audio signals are transmitted so that they can be recognized by the user to some extent. By way of example, there have heretofore been proposed various techniques such as changing lines in the vertical direction at every 1H (H being a horizontal scanning period), replacing each half of a line, carrying out the preceding operation at every several horizontal intervals and changing the processing at every several frames.

FIG. 10 shows an arrangement of a descrambler used in an existing cable TV box. An input terminal 41 in FIG. 10 receives signals supplied from a line which is normally supplied by a cable distributer to the viewer. The signal supplied to input terminal 41 is a scrambled RF (radio frequency) signal which is received by a tuner 43. An operation key 47 or a remote controller 42 are utilized to select the baseband signal which is to be supplied as an output by tuner 43. This baseband signal is supplied to a descrambler circuit 44 which descrambles the baseband signal. The descrambled signal is modulated onto a predetermined broadcast frequency, such as channel 3, by a modulating circuit 45 and then output from the cable box. This output signal is supplied to a tuner 46 contained within a TV receiver or VTR and tuned to the predetermined broadcast frequency to reproduce the video image and audio signal.

FIG. 11 shows an arrangement of a descrambler utilized with the existing satellite broadcast systems. As shown in FIG. 11, an RF signal from a BS/CS antenna 51 is supplied to a BS/CS tuner 52 provided within a VTR or TV. Channel selection is carried out by utilizing an operation key 58 or a remote controller 57. A detected output signal 53 from tuner 52 is supplied to a descrambler 54. A video signal 55 and an audio signal 56 thus descrambled by the descrambler 54 are each output twice, for example. One set of video and audio signals 55, 56 are supplied to the line input of the VTR, and the other set of video and audio signals 55, 56 are supplied to the line input of the TV receiver.

A method of releasing the scrambler, i.e., descrambling, and a method of collecting by the program distributer service charges will be described next. Descrambling is carried out by using an ID (identification) number assigned to the cable box (descrambler apparatus) and a key code contained in a corresponding broadcast signal. When a subscriber (television viewer) pays a service charge, the broadcasting enterprise transmits the key code recognized by the cable box to descramble the broadcast signal. The key code and the ID number are related by enciphering.

There are many pay channel broadcasting systems and they tend to increase. In accordance therewith, the number of descramblers that are used by the user (television viewer) increases as the number of subscriptions increases. Mainly in European countries, there is available a descrambler that resembles an IC telephone card, known as a "smart card", that is commonly used for many types of descramblers. Therefore, the user can receive several pay channel broadcasting programs using one descrambler.

There have heretofore been proposed audio-video equipment such as a digital broadcasting system or a teleconference system in which a video signal is digitized and transmitted via radio waves or cable and a digital VTR records the digital signal on a magnetic tape. When a video signal is digitized, the amount of information representing the video image is quite large and, therefore, a high-efficiency coding system that compresses data as much as possible is frequently utilized. Of the various high-efficiency coding systems, discrete cosine transformation (DCT) is commonly used.

During discrete cosine transformation, an image of one frame is formed into, for example, an (8×8) block structure, where each block (of pixels) is processed by utilizing a discrete cosine transform, which is one type of an orthogonal transform. The transformed data is further processed, as by weighting, requantization or the like. According to the above-described process, energy components within each (8×8) block can be concentrated into a certain area, and data in other areas are converted to "0" or negligible values close to "0". If the later data are removed, the amount of data needed to represent the image can be reduced to some extent.

Despite the above-mentioned process, the amount of data is still large. Therefore, the coefficient data resulting from the discrete cosine transformation are processed using a Huffman coding process in which the coefficient data are converted into data having different bit lengths in response to the probability at which a signal is generated. Such processing may include variable length coding. Hence, data can be compressed to the extent needed for a consumer digital VTR to record and reproduce digitized video pictures. In order to facilitate data processing during reproduction, framing is carried out in which a coded signal is inserted into a data area within a sync. block of a constant length and the sync. block is formed by adding a parity, a synchronizing signal, an ID signal or the like for protecting such data.

A two-dimensional Huffman coding system is frequently utilized as one of the variable length coding systems because of its high efficiency. This coding system is referred to as an amplitude run length coding system in which one event is defined to a value of each coefficient whose value is not "0". If an (8 ×8) block, for example, is processed by the two-dimensional Huffman coding system, then it is frequently observed that all of the data equals "0" after a certain amount has been processed. In this instance, no coefficients which have a value equal to "0" are supplied and instead, a code EOB (End of Block) indicative of the end of the block is inserted.

In a digital VTR using a magnetic tape and in a digital disc recording and reproducing apparatus using a disc-shaped recording medium, it is customary that video data of one or a plurality of field or frames are recorded on a plurality of tracks. In this instance, if the number of tracks per field/frame are different for each field/frame, there is then the disadvantage that processing is not satisfactorily effected. Therefore, a constant number of tracks per field (or frame) is frequently selected. Although the amount of data remains constant in a system in which data is not compressed, if data is compressed using the above-described DCT process, the amount of data varies depending upon the picture content. Further, because data is processed by a variable length coding system, the amount of data in a predetermined period is constantly changing. In order to record such data in a constant number of tracks, it is necessary to have a buffering system which makes the amount of data in a predetermined period less than some predetermined target value.

By way of example, there has heretofore been proposed a buffering system in which a resultant amount of data is made less than a target value even for a period of one field or one frame by controlling the amount of data in a predetermined period (referred to as a buffering unit) which is shorter than one field or one frame. According to this buffering system, data which is to be transmitted can be made less than a target value by requantizing the coefficient data of the DCT transformed AC component of the signal with proper quantization step. A quantization step code or quantization number indicative of the quantization step is transmitted with the coded data.

FIG. 6 shows an example of a sync. block of component signal transmission data according to the prior art. As shown one buffering unit is formed of 5 sync. blocks. A block synchronizing signal SYNC is located at the starting position of each sync. block, followed by an ID signal, a quantization number QNO, and auxiliary information AUX. DCT coefficients are disposed in the data area of each sync. block followed by parity data (error correction code). It is common for the error correction code to be Reed Solomon code. Data which is coded by a variable length coding system is arranged (this process being referred to as "packing") into 8-bit data and then recorded in the data area. In general, because a buffering unit has only one quantization number QNO, the quantization numbers QNO of the respective sync. blocks have the same value.

The data area will now be described with reference to FIG. 7. In the case of an (8×8) block, for example, if sample data of 8 pixels ×8 lines, shown in FIG. 7A, are processed in a DCT (discrete cosine transform) fashion, then such data is converted into coefficient data formed of a direct current component DC and alternating current components AC1 to AC63 as shown in FIG. 7B. Arrows in FIG. 7B represent zigzag scannings that are generally carried out. The direct current component DC expresses an average luminance value on the basis of a DCT definition and it is known that the direct current component DC has a value approximately twice the average of the absolute values of the 64 pixels. In addition, the direct current component DC represents the maximum energy of the block and therefore is the most important component during transmission.

When data is processed by a variable length coding system, the number of bits of one word can be detected by sequentially checking the input data. Accordingly, if an error occurs even in one place, the word interval cannot be detected and as a result, succeeding data cannot be checked, causing a propagation error. That is to say, although the variable length coding system is excellent for efficient data compression, it is very weak against errors. Therefore, it is customary that the direct current component DC is not processed by the variable length coding system, and only the alternating current components AC1 to AC63 are processed by the variable length coding system.

In FIG. 6, a 9-bit DC component, a 1-bit motion flag M and a 2-bit activity code (definition of picture) are typically arranged as the most important words. Thereafter, alternating components in the DCT block that had been processed by the variable length coding system are sequentially filled in the direction of the alternating current components AC1 to AC63. In this example, Y has a fixed area AC-L of 12 bytes, C has a fixed area AC-H of 6 bytes and the alternating current components are stored therein as described above. At that time, when the alternating current components are stored up to the EOB of the DCT block within the fixed AC-L area, remaining bits in the fixed AC-L area are newly defined as variable AC-H areas. Then, the variable AC-H area and the fixed AC-H area are combined as a new AC-H area, and components that had not yet been stored in the fixed AC-H area are stored therein sequentially. As a method of storing components in the data area, in addition to the above-mentioned regular framing method, there is known a front framing method of sequentially storing all data or the like.

When the above-mentioned fade-in and fade-out effects are achieved by digital equipment such as a digital VTR or the like, digital data of the luminance signal Y and the chrominance signal C are reconverted into analog data and processed by the circuit arrangement shown in the latter half of FIG. 9. It is generally known that, if an analog circuit and a digital circuit are provided as a mixed or hybrid circuit, then noise generated by the digital circuit or the like enters and interferes with the analog circuit. For example, problems such as ground pattern layout or the like may be introduced. For this reason, it is preferable to reduce the analog sections as much as possible.

Another problem with the above-mentioned circuit is that the fade-in and fade-out effects can only be achieved in the analog output of the digital VTR but cannot be achieved in the digital output. That is to say, users can enjoy the fade-in and fade-out effects on the existing TV monitor receiving the analog signal output, but cannot enjoy such effects on a future TV monitor which receives a digital signal directly. Audio-video equipment becomes expensive when fade-in and fade-out are achieved by using special circuitry in the digital output.

Typically, a scrambler may be implemented by a wide variety of circuits such as an analog-to-digital (A/D) converter for converting an analog signal into a digital signal, one or a plurality of frame or field memories and line memories for storing the converted digital signal, a digital-to-analog (D/A) converter for reconverting a digital signal into an analog signal, a control circuit for controlling the above-mentioned circuit elements or the like.

The scrambler utilized by a broadcasting enterprise is usually of a professional type and only one scrambler need be used for the transmission of TV signals. Ordinarily, the size and cost of the circuitry are not objectionable. However, a user's descrambler requires circuits similar to those described above, and here such a descrambler becomes expensive.

On the other hand, a descrambler utilized with a digital TV broadcasting system, will not require an A/D converter, D/A converter and so on. Further, almost all of the digital circuits within the descrambler can be commonly used by a digital tuner. That is, when the present broadcast/receiver system, i.e.; antenna—tuner—descrambler—TV is changed to the future system, i.e., antenna—digital tuner—TV, it is expected that the digital tuner will include the descrambler function. In FIG. 11, the tuner 52 and the descrambler 54 will be integrated as the digital tuner. At that time, the key for descrambling may be supplied in the form of a card such as an IC card, magnetic card or the like, supplied by the broadcast enterprise.

SUMMARY OF THE INVENTION

Accordingly, it is an object of the present invention to provide a processing apparatus which overcomes the shortcomings of the above described devices.

It is another object of the present invention to provide a processing apparatus which can achieve fade-in and fade-out effects by the addition of a minimum number of circuits and which can output such fade-in and fade-out effects in both analog and digital form.

It is a further object of the present invention to provide a system having a descrambler circuit for use with a digital TV broadcasting system and a consumer digital VTR which is inexpensive compared to existing analog system descramblers.

In accordance with one embodiment of the present invention, transmitted compressed frequency components (e.g. DCT) of a digital signal, which may include a DC frequency component and AC frequency components, are operated upon to selectively achieve fade-in, fade-out and scene change effects.

As one aspect of the present invention, a controlled value is varied (e.g. between a predetermined minimum value and a predetermined maximum value) and added to either the luminance portion or the chrominance portion of the DC frequency component to achieve the fade-out and fade-in effects.

In accordance with another embodiment of the present invention, compressed frequency components of a digital image signal are selectively scrambled or descrambled in whole or in part by scrambling or descrambling selected compressed frequency components (e.g. one or several fields/frames) of the digital image signal.

As one aspect of this invention, only the DC frequency component of the digital image signal is scrambled or descrambled.

As another aspect of this invention, the digital image signal is reproduced from a recording medium and a tape ID number stored in a memory associated with this recording medium is retrieved such that the digital image signal is scrambled when the tape ID number does not equal a predetermined number.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF CERTAIN PREFERRED EMBODIMENTS

Figure 1:
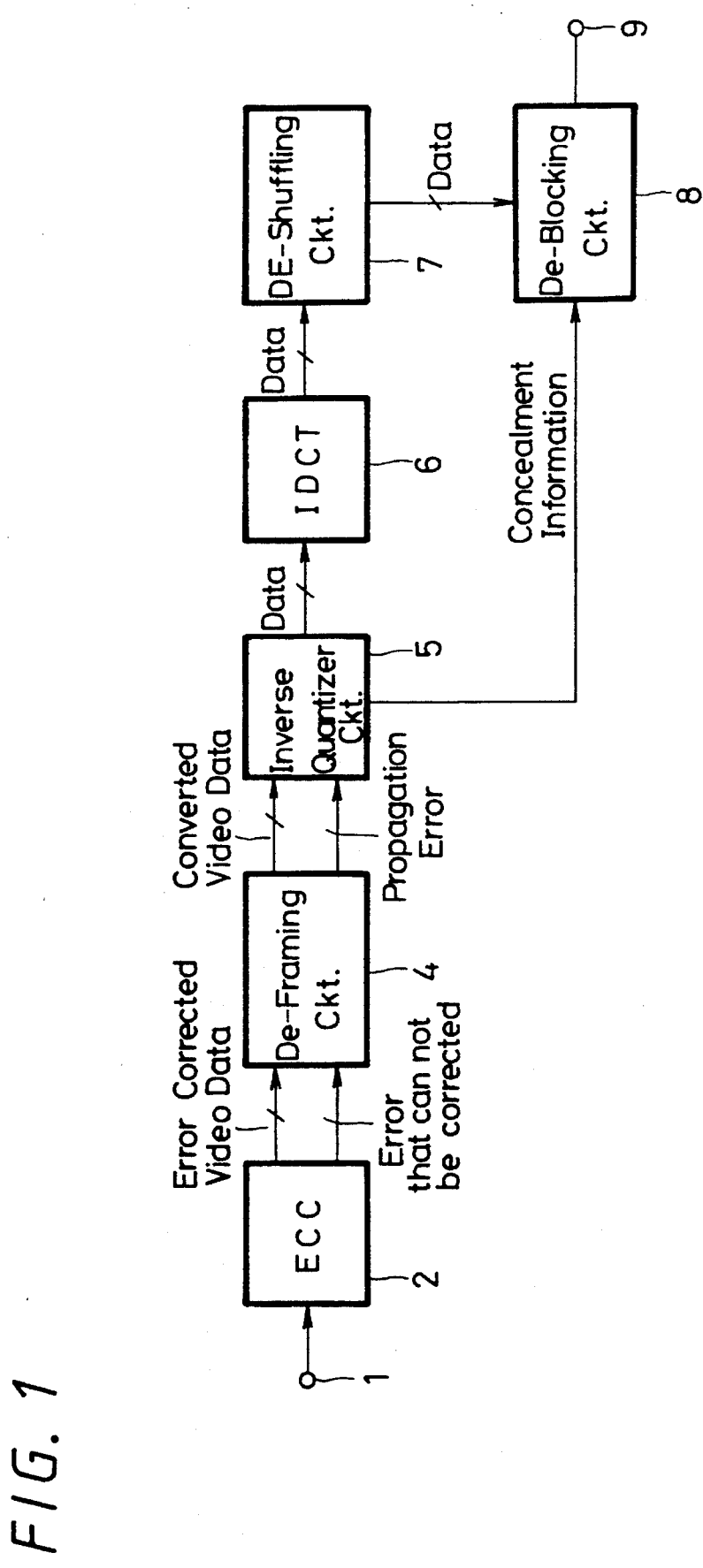
FIG. 1 is a block diagram showing an overall circuit arrangement of a data processing circuit of a reproducing section in accordance with the present invention.
Figure 6:
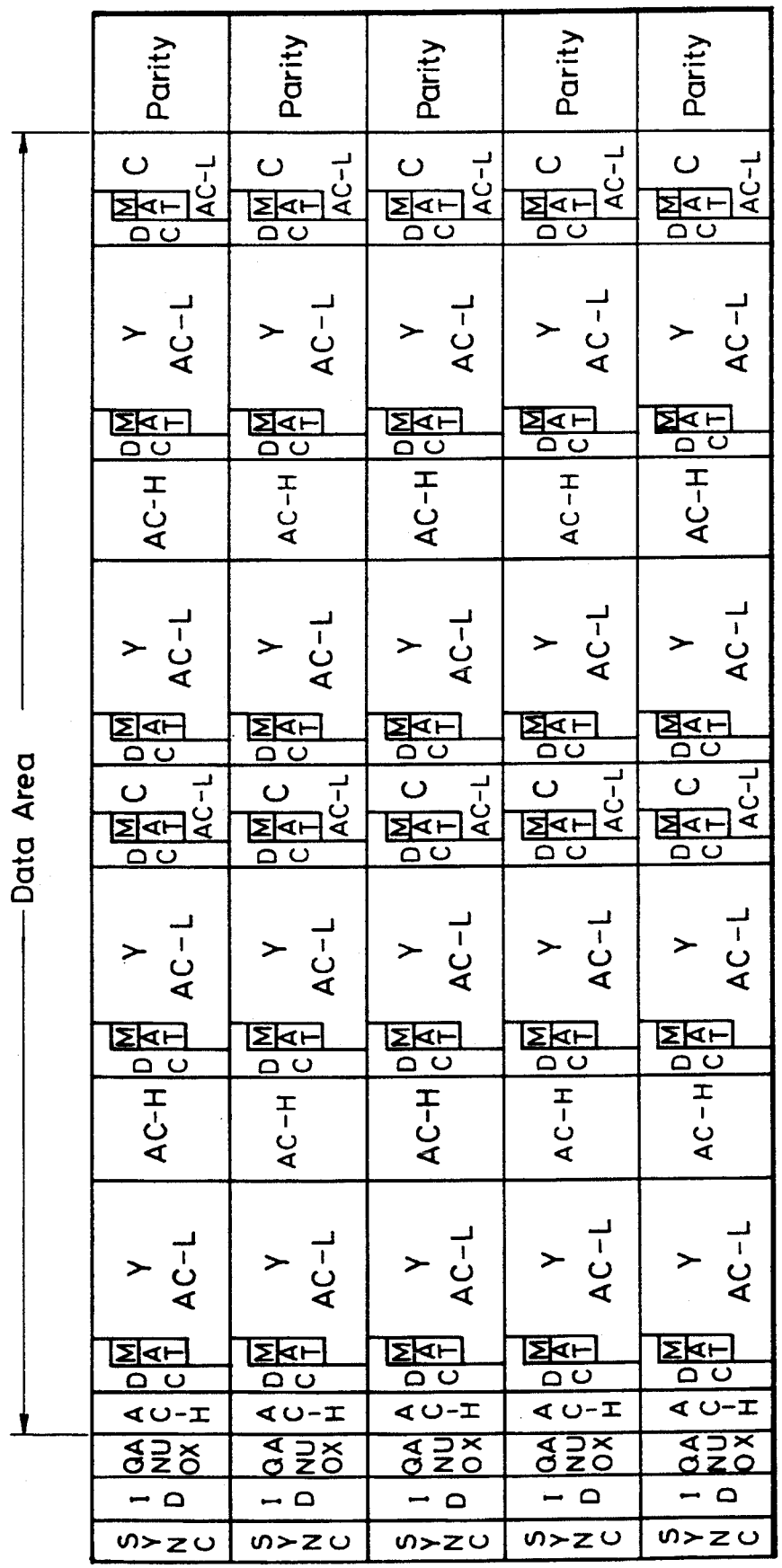
FIG. 6 is a diagram schematically showing an example of a sync. block of a digital system component signal transmission data.

An embodiment of the present invention will hereinafter be described with reference to the drawings. FIG. 1 shows a video data processing circuit provided in the reproducing section of a digital VTR. As shown, digitized video data that was arranged as shown in FIG. 6 is supplied to an input terminal 1. This video data is supplied to an error correction (ECC) circuit 2 for error detection and error correcting. The ECC circuit 2 detects errors in the video data and error-corrects data that can be corrected. Non-erroneous data and the errors that could not be corrected are supplied to a de-framing circuit 4. The de-framing circuit 4 re-arranges the data of the format shown in FIG. 6 into its original format, and components of the DCT coefficients are processed by the variable length coding system as described above so that, if an error occurs in one location of a word, the word interval cannot be detected and the following data cannot be utilized, causing a propagation error. De-framing circuit 4 supplies the data which has been reconverted into its original form and the propagation error to an inverse quantizer circuit 5.

The inverse quantizer circuit 5 determines whether or not a DCT block in which the error containing the propagation error exists can be reproduced as a picture. If the DC component, which is the most important component, and an AC low band component close to the DC component contain an error, then such block cannot be reproduced. Hence, such data is replaced with data of a preceding field or frame (this processing is referred to as "concealment"). The inverse quantizer circuit 5 supplies the concealment information to a de-blocking circuit 8. Further, the inverse quantization circuit 5 performs processing opposite to the quantization carried out on the recording side of a digital VTR and supplies this data to an inverse DCT (IDCT) circuit 6.

Figure 7B:
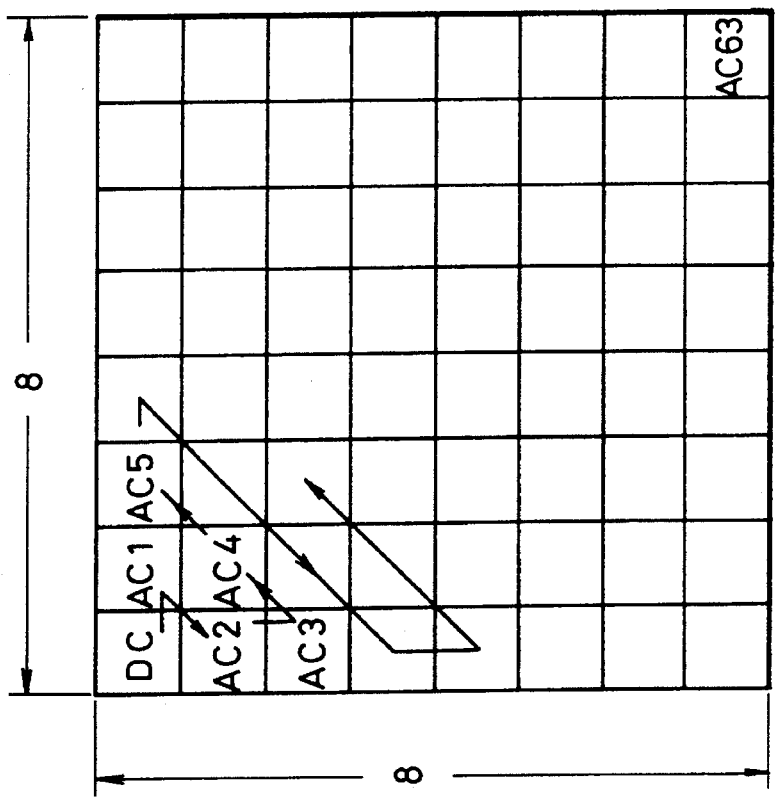
FIGS. 7A and 7B are schematic diagrams used to explain discrete cosine transformation.
Figure 7A:
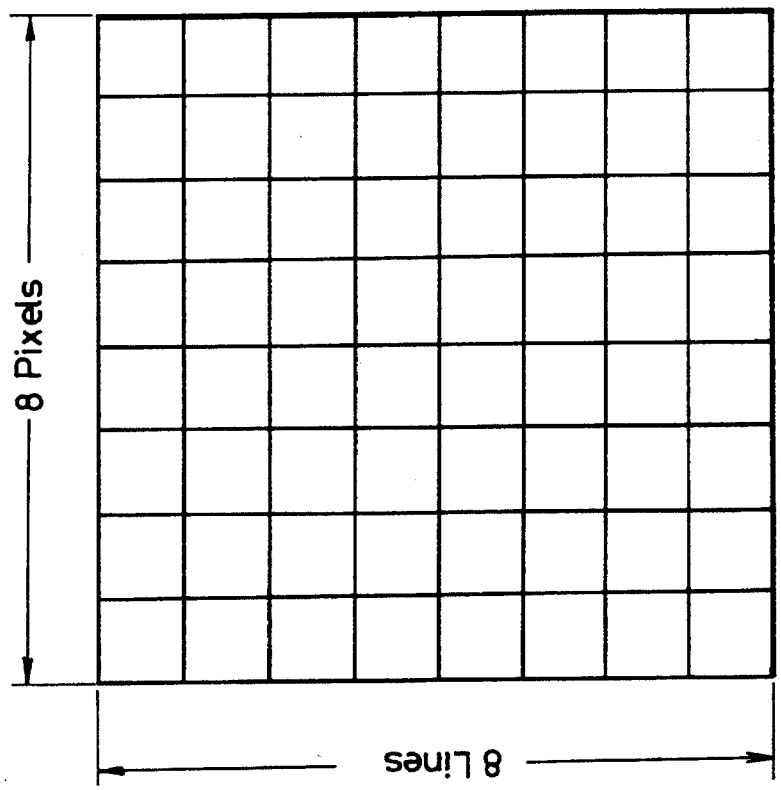
Figure 9:
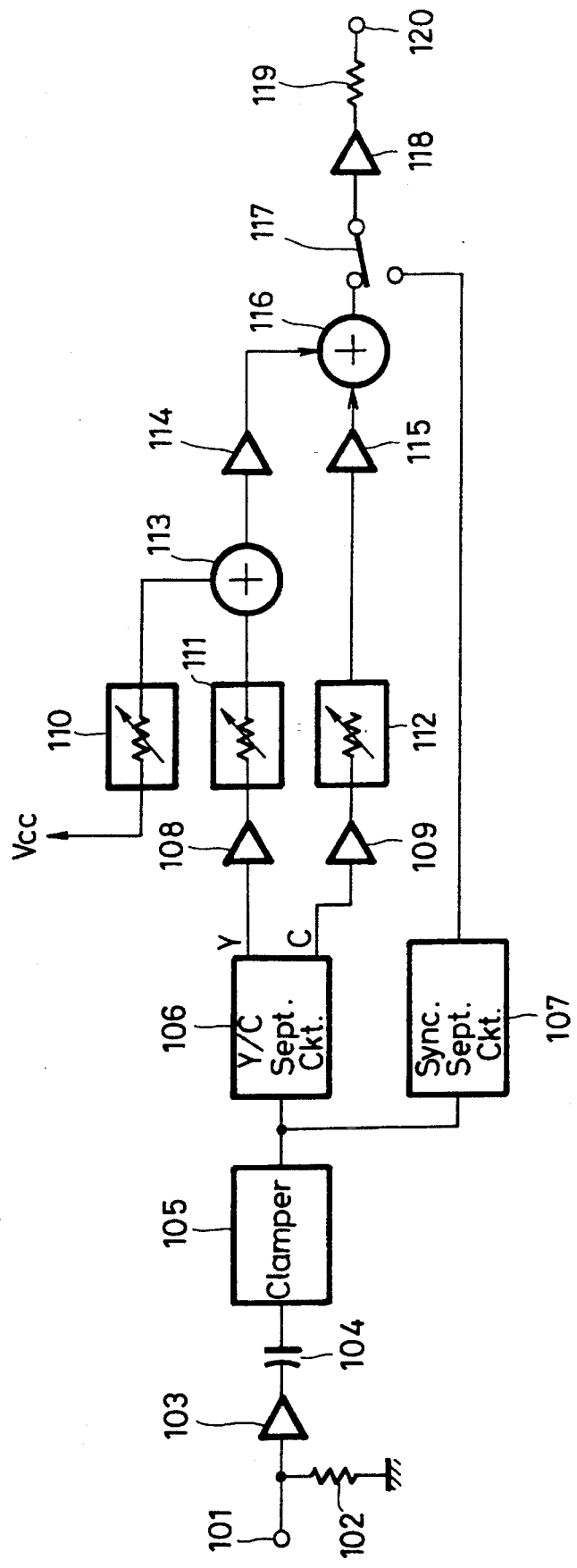
FIG. 9 is a block diagram showing a traditional analog system fade-in/fade-out circuit.
Figure 10:
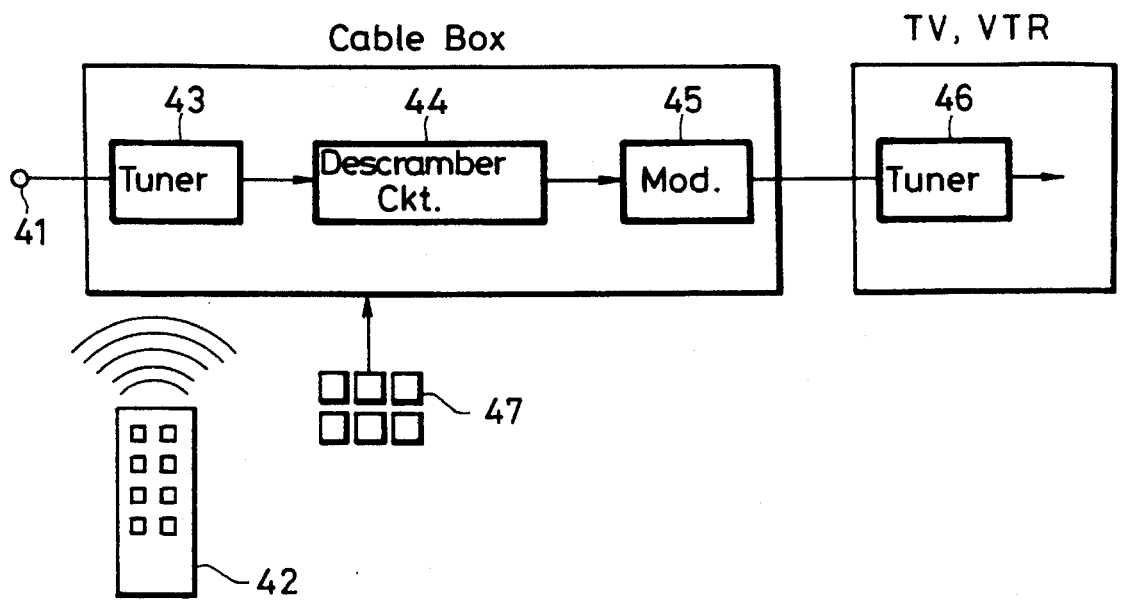
FIG. 10 is a schematic diagram of a descrambler system used in conventional cable TV systems.
Figure 11:
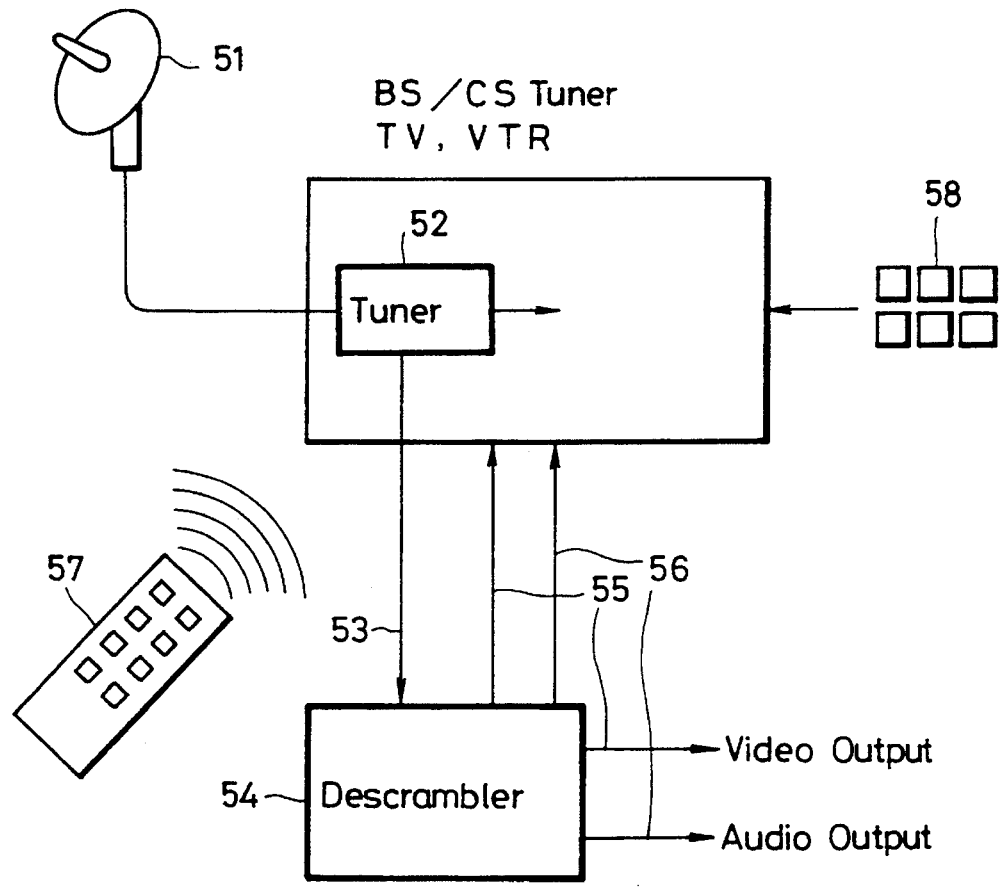
FIG. 11 is a schematic diagram of a descrambler system used with conventional satellite broadcasting.

The IDCT circuit reconverts 64 simple data sequences shown in FIG. 7B into time and space data shown in FIG. 7A, and supplies the reconverted data to a de-shuffling circuit 7. De-shuffling is the reverse process of shuffling, which collects data of one buffering unit from various parts of the picture. By shuffling the data, it is possible to prevent the data from becoming uncorrectable because of a concentration of errors due to a scratch on the longitudinal direction of a tape, a head clogging or the like. Also, during shuffling, total bit numbers of collected data are averaged, which results in improved picture quality. De-shuffling returns the collected data to their original positions.

An output from the de-shuffling circuit 7 is supplied to a de-blocking circuit 8 which re-arranges data of (8 pixels×8 lines) shown in FIG. 7A into two-dimensional image data formed of horizontal and vertical data. The aforesaid concealment information is supplied to de-blocking circuit 8, in which a block that cannot be reproduced is concealed. The output of de-blocking circuit 8 is supplied as an output at output terminal 9.

Figure 2:
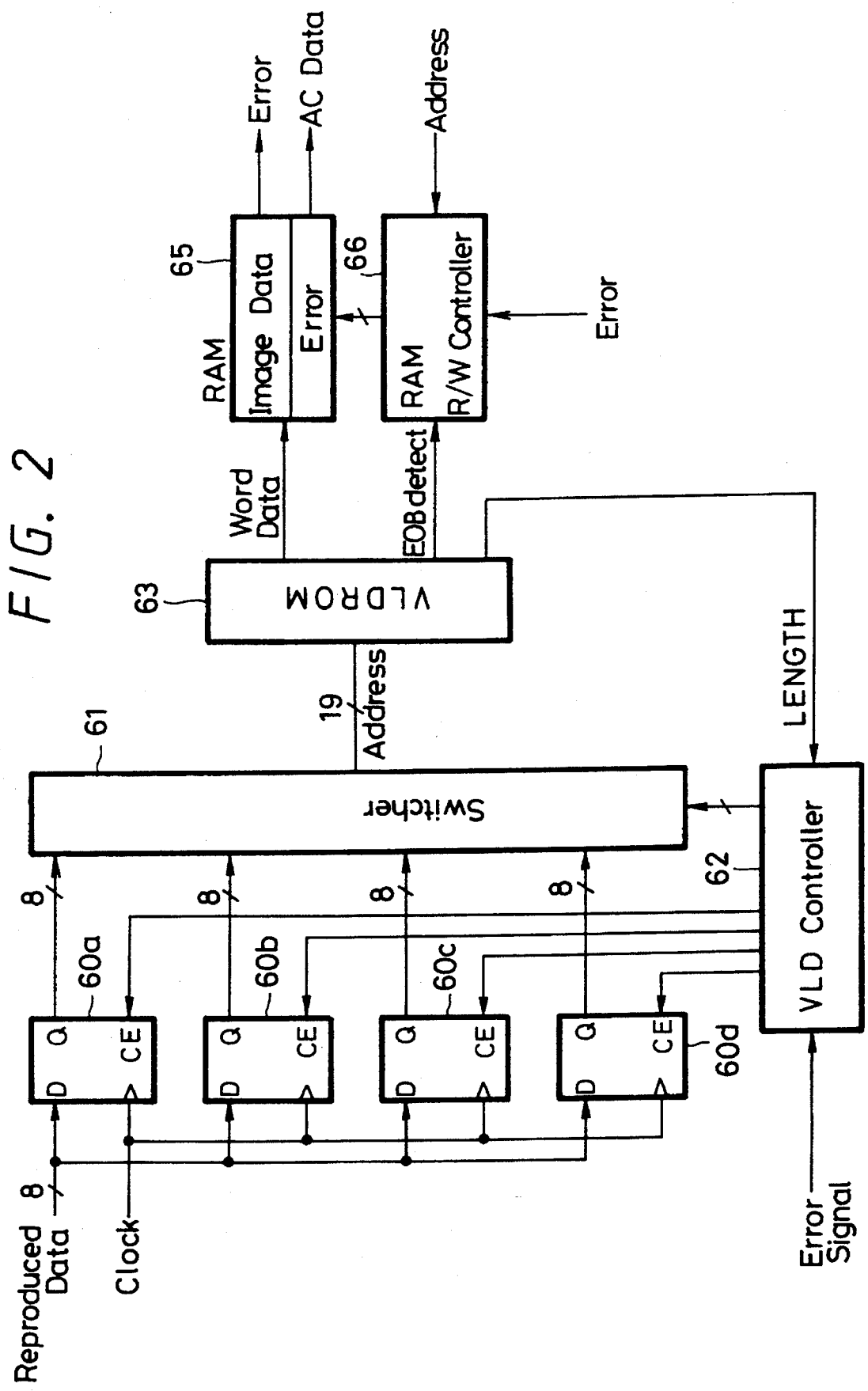
FIG. 2 is a block diagram showing a part of the de-framing circuit of FIG. 1, which reconverts a variable length coded AC component into an original fixed length code.

FIG. 2 shows that portion of a de-framing circuit which reconverts a variable length coded AC component into an original fixed length code. FIG. 2 illustrates the process of variable length decoding (VLD) which includes a reverse process of packing. Generally, 8-bits of received or reproduced data are latched to one of the 8-bit D-type flip-flops 60a to 60d. The maximum number of bits for variable length coding is selected as 32-bit data which is latched to, for example 19 bits, by a switcher 61. The 19-bit data (for example) thus selected is supplied as an address of a VLD ROM (read-only memory) 63. The VLD ROM 63 reads out a word and a word length (LENGTH) in response to the address input. At that time, the VLD RAM 63 simultaneously detects the EOB and supplies the same to a RAM read/write controller 66 to update an address of a RAM 65. The word data read from the VLD ROM is supplied to the RAM 65 and written therein under the control of the RAM read/write controller 66. The LENGTH data is supplied to a VLD controller 62 which determines, on the basis of the LENGTH data, which one of the 8-bit D-type flip-flops 60a to 60d is supplied with the next data. Further, the VLD controller 62 controls the CEs (Clock Enables) of the D-type flip-flops 60a to 60d and at the same time, switcher 61 determines which 19-bit data is to be selected from the 32-bit data.

The process of variable length decoding (VLD) when an error occurs will now be described. Let it be assumed that an error signal is supplied to the VLD controller 62. When data is coded by a variable length coding system, bit numbers of a word are detected by sequentially checking the input data. Accordingly, if an error occurs in one location, the length of the word cannot be detected and the following data cannot be checked, causing a propagation error. In this case, because the error continues until the next buffering unit, the write operation of the RAM 65 is inhibited under the control of the RAM write/read controller 66.

The RAM 65 is comprised of an image data storage section and an error flag storage section. Each time data is read out, an error flag is raised. If an error flag corresponding to a write address is not raised when data is written, then a portion in which the error flag is raised becomes an address in which data cannot be written due to the error. Therefore, when the RAM data is read, the above-mentioned propagation error is minimized.

Figure 3:
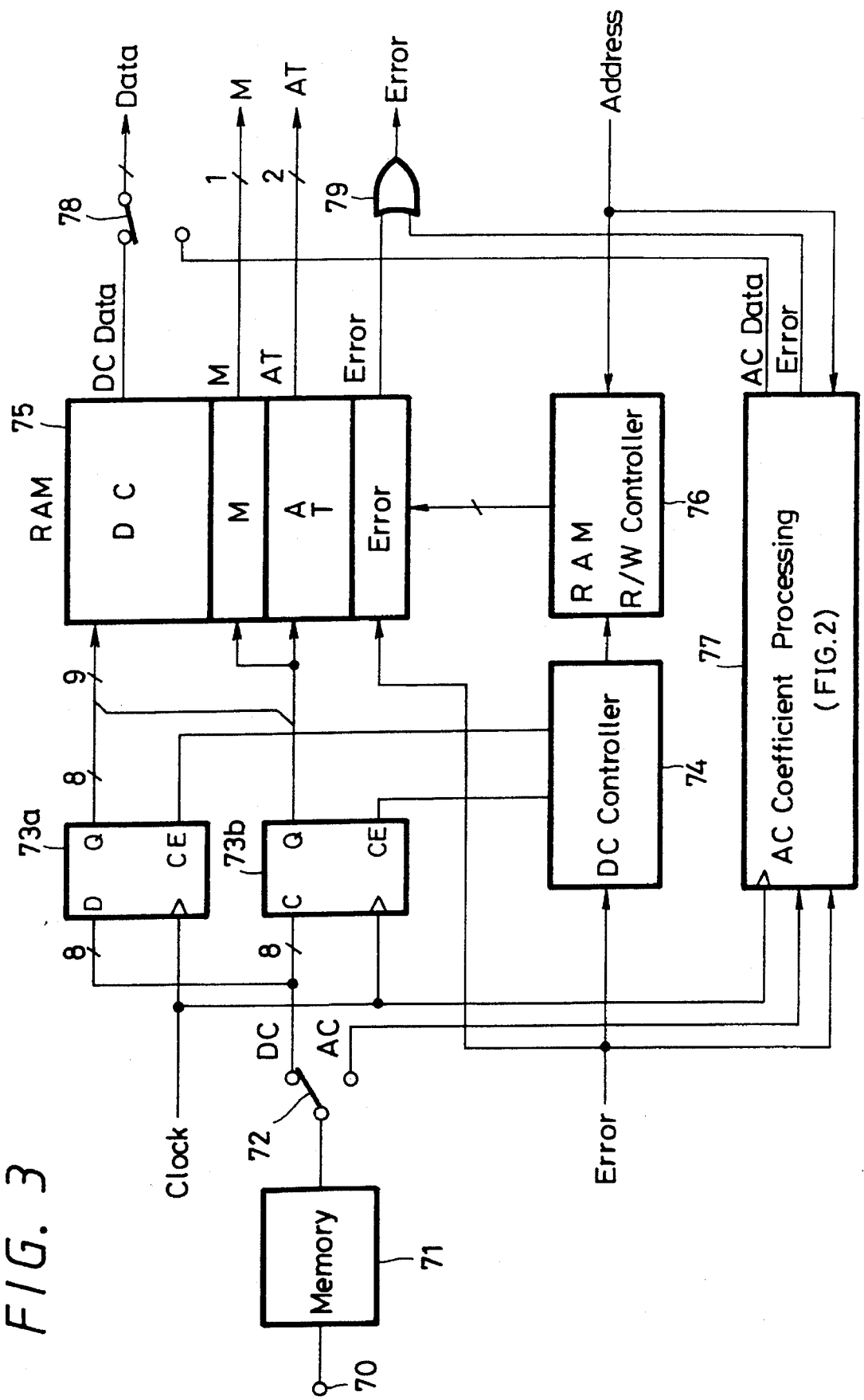
FIG. 3 is a block diagram of an overall circuit of the de-framing circuit of FIG. 1.

FIG. 3 shows an example of the entire circuit arrangement of the de-framing circuit according to the present invention. As shown in FIG. 3, the output from the ECC circuit 2 shown in FIG. 1 is supplied to an input terminal 70 and is temporarily stored in a memory 71 for facilitating the following process. The output of the memory 71 is supplied to a switch 72, which separates the AC component from the DC component. The AC component is processed by the circuit shown in FIG. 2 or the like while the DC component is processed as described below.

The DC component is latched by two 8-bit D-type flip-flops 73a, 73b, whereby a DC controller 74 controls the flip-flop timing via their Clock Enable (CE) inputs. The latched data is classified as either DC, M or AT, and written in a RAM 75 at an address controlled by a RAM read/write controller 76. The error flag in the RAM 75 is similar to the error flag discussed with reference to the AC coefficient in FIG. 2.

During reproduction, either AC data or DC data is selected by a switch 78 and supplied to the inverse quantizer circuit 5 shown in FIG. 1. Although M and AT data (motion and activity data) are supplied to the inverse quantizer circuit 5 unchanged, error flags of the DC component and AC component are synthesized by an OR circuit 79 and then supplied to the inverse quantizer circuit 5. At that time, the DC error is the most important word and becomes a propagation error. Therefore, the DC error flag and the AC error flag are received by the OR circuit 79.

Figure 4:
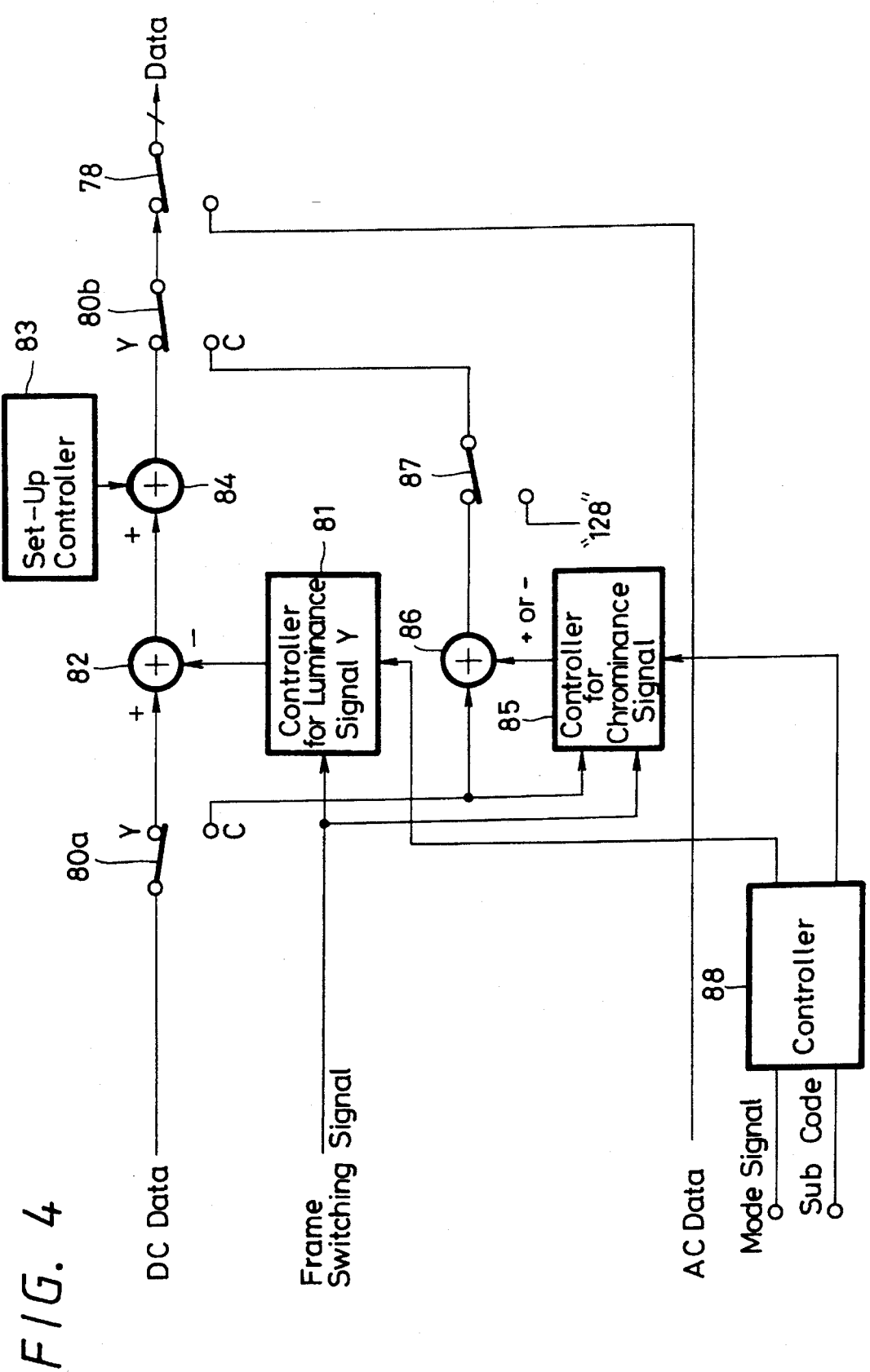
FIG. 4 is a block diagram of a circuit that is added to the de-framing circuit in accordance with the present invention.

FIG. 4 shows an addition circuit for the fade-in and fade-out function according to the present invention. This addition circuit is inserted between the DC data output and switch 78 of the de-framing circuit shown in FIG. 3. The addition circuit is adapted to control the values of the DC data but not to affect the AC data. Switches 80a and 80b simultaneously toggle positions in response to the luminance signal Y and the chrominance signal C. An adder 82 subtracts a value supplied from a controller for luminance signal Y 81. The output of adder 82 is supplied to an adder 84 which adds an output value of a set-up controller 83. An adder 86 adds or subtracts the value supplied from a controller for chrominance signal C 85. The output of adder 86 is supplied through a switch 87 to switch 80b. Switch 87 is adapted to select the value "128" to be the DC value for the chrominance signal C. A frame switching signal is supplied to the Y controller 81 and the C controller 85 in order to change the values to be added or subtracted at each frame. As previously described, the direct current component DC expresses the average luminance value of the whole block on the basis of a DCT definition and has a magnitude twice the average of the absolute value of 64 pixels. Since the direct current component DC represents the maximum energy of a block, features of the picture corresponding to each block can be greatly changed by varying its value.

Figure 5A:
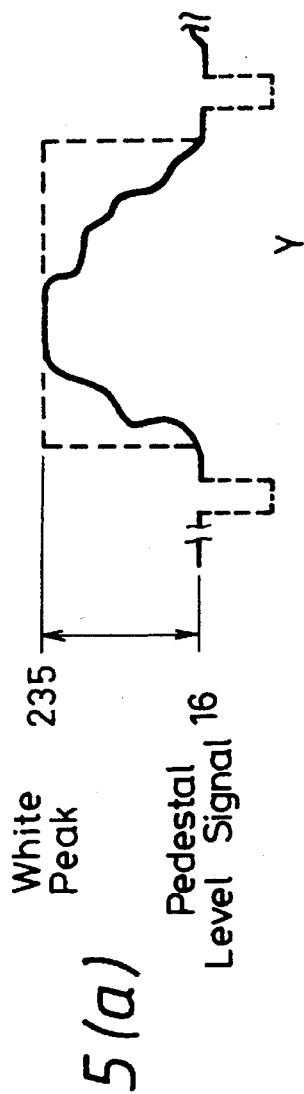
FIGS. 5A and 5B are signal diagrams showing the relationship between a video signal level and a quantization level.
Figure 5B:
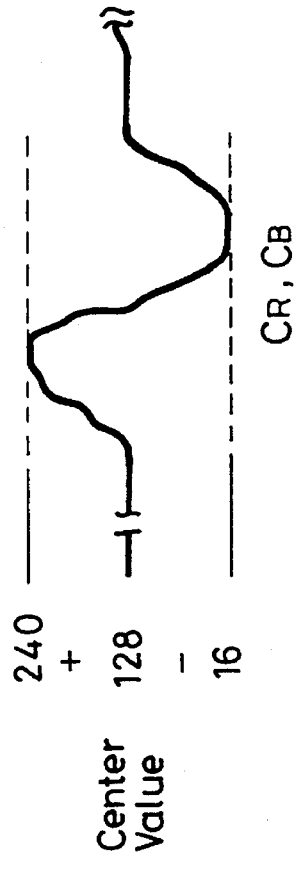

FIGS. 5A and 5B show a relationship between the video signal level and the quantization level in professional digital VTRs or the like. Video data is obtained by quantizing an analog component signal, i.e., the luminance signal Y and the chrominance signal C (and more precisely, color difference signals Cr, Cb). The relationship among the luminance signal Y, the color difference signals Cr, Cb and the three primary color signals R, G, B may be expressed by the following equation:

$Y = 0.299R + 0.587G = 0.114B$ $Cr = R - Y$ $Cb = B - Y$

As illustrated in FIG. 5, the luminance signal Y is quantized by 220 levels, where its pedestal level signal may be thought of as level "16" and its maximum white level may be thought of as level "235". With respect to the chrominance signal C, when the difference between the color difference signals R–Y and B–Y is 0, the center value is selected to be at level "128" and changed to a maximum level "240" in the positive direction (+) and to a minimum level "16", in the negative direction (–). That is, if the color difference signals Cr, Cb are selected to be "128" and the value of the luminance signal Y is changed from "16" to "235" then the picture is changed from black to gray to white. This principle is applied to the fade-in and fade-out feature.

To realize the above-mentioned principle, digital data must be operated upon prior to digital-to-analog (D/A) conversion (not shown) of the signal supplied to output terminal 9 shown in FIG. 1. In this case, three circuits are required, one for the luminance signal Y and one each for the color difference signals Cr and Cb. However, in accordance with the present invention, since only the DC component, in which the luminance signal Y and the chrominance signal C are mixed, which is output from the deframing circuit in FIG. 4, needs to be operated upon, the circuit arrangement is kept simple. As to this DC component, about 9-bits of data are generally allocated as the fixed length and therefore this 9-bit data is used as the DC component, and it is known that the DC component can be only a positive value in accordance with a defined equation.

Returning to FIG. 4, the white fade-out operation will now be described. In response to a white fade-out command supplied thereto, the Y controller 81 progressively increases, incrementally or stepwise, from an initial value of "0" and at the same time, the set-up controller 83 progressively increases, incrementally or stepwise, from the initial value of "0" the digital signals whose values are supplied to adder 82 and adder 84, respectively. In addition, the C controller 85 determines whether or not the DC component of the chrominance signal component C is larger than "128", and based upon this determination, either adds or subtracts a complementary value from the DC component of the chrominance signal C in adder 86. This value to be added or subtracted, which is supplied from C controller 85 to adder 86, is progressively increased, incrementally or stepwise, from the initial value of "0" and then is approximated such that the DC component of the chrominance signal C approaches the center value of "128". Because 9 bits are used to represent the DC component, when the output of the C controller 85 is approximately "128", switch 87 is switched to the "128" side such that the DC component of the chrominance signal C is set equal to 128. At this time, the DC component of the luminance signal Y is "235" or more and thus, the luminance signal Y is at the white level. At this point, the white fade-out operation is complete.

In the white fade-in operation, the maximum value output by Y controller 81 is progressively decreased, decrementally or stepwise, in order to approach the value "0" and at the same time, the value of the set-up controller 83 also is progressively decreased, decrementally or stepwise, to approach the value "0". Switch 87 is switched to adder 86 and the output of the C controller 85 then is progressively decreased, decrementally or stepwise, to approach the value "0".

The black fade-out operation is carried out by using the above-mentioned white fade-out operation but the value of the set-up controller 83 is kept at its initial value of "0". The black fade-in operation is the reverse operation of the black fade-out operation.

Figure 8:
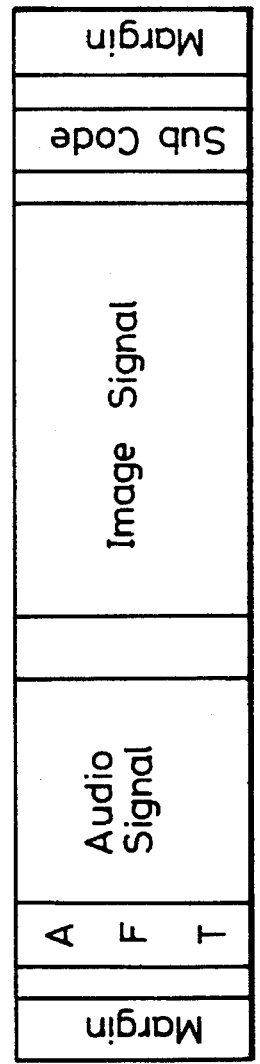
FIG. 8 is a schematic diagram showing a tape format which is utilized by a digital VTR.

The Y controller 81 and the C controller 85 in FIG. 4 are controlled by a controller 88 which is supplied with a predetermined mode signal and a sub code signal from a system controller (not shown). Thus, the Y controller 81 and the C controller 85 are controlled in response to these signals. The sub code signal can be recorded in a sub code area of a record tape of a digital VTR having, for example, the format shown in FIG. 8. Therefore, without changing the original video signal, operations such as a fade-in operation, fade-out operation or the like, can be carried out by utilizing the sub code signal recorded in the sub code area of a track. Thus, rehearsals or the like can be repeatedly carried out with ease and a desired process can be accurately observed. In another embodiment of the present invention, the set-up controller 83 and the Y controller 81 are combined, and the value of the set-up controller 83 and the value of the Y controller 81 are added together and supplied as a single value to only one adder, and therefore, only one of the adders 82, 84 are needed. As another modification, all of the circuit elements which are utilized for the chrominance signal C (in FIG. 4) may be removed. Here, fade-in and fade-out can still be accomplished since the white and black luminance components can be expressed solely by the luminance signal Y. In this case, however, even when the luminance signal Y becomes completely white or black, if a brightness setting on a TV monitor is set to its brightest level, a very small color component nevertheless may be observed, but if such a minor defect is acceptable, the process of fade-in and fade-out becomes greatly simplified.

Further, in the circuit arrangement shown in FIG. 4, if the value of the chrominance signal C, (the color difference signals Cr and Cb) is properly altered, the color fade-in operation, color fade-out operation and change of scene in color operation can be realized with ease, e.g., Cr=Cb=240 yields the color magenta, and Cr=Cb=0 yields the color green.

In accordance with the present invention, the fade-in/fade-out circuit of FIG. 4 is added to the circuit of FIG. 1, for example, it may be coupled to the output of the inverse quantizer circuit 5 shown in FIG. 1. While only the direct current component DC is operated upon thereby simplifying the circuit arrangement and achieving the effects described above, the present invention can be carried out by operating upon all of the DCT coefficients, that is, both the direct current (DC) component and the alternating current (AC) components.

As described above, when a particular coefficient of the compressed code is operated upon, the fade-in and fade-out effects can be realized by the addition of a minimum amount of circuitry. Therefore, a fade-in and fade-out circuit for the analog circuit portion is unnecessary thus reducing the amount of additional analog circuits that otherwise would be needed.

Further, because the present invention is carried out immediately after the de-framing process, the circuit scale is reduced. Also, a color fade-in or fade-out in a color scene change operation can be carried out easily by the same circuit in addition to the white and black fade-in, fade-out and scene change operations.

The process resulting for generating a scramble command from a reproduced or broadcast signal will now be described. As earlier noted, the direct current component DC expresses the average luminance value of a whole block on the basis of the DCT definition and has a magnitude approximately twice the average of the absolute values of the 64 pixels arranged in the usual 8×8 array. Since the direct current component DC is the maximum energy component in an 8×8 block as described above, if this data is not reproduced, a picture corresponding to the DCT block cannot be reproduced, that is, even a mosaic picture cannot be reproduced.

In accordance with the present invention, a scramble command is supplied to the DC controller 74 shown in FIG. 3 such that the location in which the direct current component DC normally is present is intentionally shifted. In addition the AC low band component, which also has a large energy component, has its location intentionally shifted as well.

If the aforesaid operation is carried out for each buffering unit or at times which encompass several buffering units, at the normal position of several frames or at shifted positions, then scrambling effects similar to those of the prior art can be achieved. Therefore, the present invention is suitable for pay channel digital broadcasting.

While the reproducing section of a digital VTR is shown in FIGS. 1, 2 and 3, it is appreciated that the processing circuits of a digital broadcast receiver are fundamentally the same.

The above-described scrambling feature used in conjunction with a video tape is particularly useful for professional systems and rental systems or the like. In some professional systems, there are available exclusively-designed VTRs and tapes which can be reproduced only by such exclusively-designed VTRs, such as those used in an airplane in which a movie is shown in the passenger cabin. In order to prevent such video tapes from being reproduced by other video systems, various troublesome copy prevention techniques are used, such as reversing the azimuths of the respective video heads or the like.

However, according to the present invention, if an ID code within the VTR and an ID code recorded on the tape used therewith are not coincident, the position of the DC component may simply be shifted and thus scrambled. Therefore, the above-mentioned troublesome techniques are not required and the cost of such a scramble system is reduced.

If a single ID code is made common to all consumer VTRs, then a professional tape which has a copyright protection code recorded thereon cannot be reproduced by a consumer VTR. Therefore, regardless of the various types of available VTRs, e.g. consumer VTRs or professional VTRs, each VTR can be designed to have a common fundamental mechanism and a common fundamental circuit, yet described features, such as scrambling nevertheless can be attained.

A tape format for use in a consumer digital VTR will now be described. When a video tape is rented, not only is the renter charged in the conventional way, i.e. a daily rental fee, but the renter also is charged for the number of times he/she plays back the recorded program, i.e. the number of viewings of the rented video tape. For example, the number of reproductions made is stored in a memory IC on the tape cassette, or recorded on tape, or stored in an IC or magnetic card bonded to the outside of the cassette, or the like. Then, if the number of reproductions made (viewings) exceeds some predetermined allowed number, scrambling is effected on the rented video tape. In addition, if the number of reproductions is not recorded, then scrambling is effected to make reproduction impossible. In the case of the sale of such a tape, the scrambling is descrambled before the tape is sold.

As a key ID for descrambling the video picture, the position information representing the location of the DC component for example, as shown in FIG. 6, may be formed by typical enciphering techniques which are known in the art.

In programming the rented video tapes, before the tape is rented a tape ID number is supplied by, for example, a video tape rental establishment to a VTR by operating a keyboard which in turn, results in recording the ID number on the magnetic tape, storing the ID number in a memory IC in the cassette or in an IC or magnetic card fixed to the cassette, together with the number of reproductions (viewing) which may be made. Then the tape is to a viewer.

The apparatus of the present invention can be applied to all digital reproducing, recording or transmitting devices which involve compressed or non-compressed digital image signals, such as a digital TV broadcasting system, a consumer digital VTR or the like. Furthermore, regardless of the various types of consumer and professional video-audio equipment that might be available, the apparatus of the present invention exhibits universal applicability by using the above-described common fundamental mechanism and common fundamental circuit. Therefore, by using a common design, the manufacturing cost thereof can be considerably reduced.

It is intended that the appended claims be interpreted as including the embodiments described herein, the alternatives mentioned above, and all equivalents thereto.

What is claimed is:

1. Digital signal processing apparatus in which compressed frequency components of a digital video signal are processed to produce special video effects, comprising:

means for receiving said compressed frequency components of said digital video signal; and means for processing said digital video signal by operating upon said compressed frequency components of said digital video signal to selectively achieve fade-in, fade-out and scene change effects.

2. The apparatus of claim 1, wherein said compressed frequency components are framed, digitized video data, and said means for receiving includes means for de-framing received digitized video data and wherein said means for processing processes said de-framed digitized video data.

3. The apparatus of claim 2, wherein said means for receiving further comprises means for detecting errors in said digitized video data and for correcting said detected errors.

4. The apparatus of claim 1, wherein said means for processing selectively achieves white fade-in, white fade-out, black fade-in and black fade-out effects.

5. The apparatus of claim 1, wherein said means for processing selectively achieves color fade-in and color fade-out effects.

6. Digital signal processing apparatus in which compressed frequency components of a digital video signal are processed to produce special video effects, comprising:

means for receiving said compressed frequency components of said digital video signal, said compressed frequency components including an orthogonally transformed DC component; and means for processing said digital video signal by operating upon only said orthogonally transformed DC component of said digital video signal to selectively achieve fade-in, fade-out and scene change effects.

7. The apparatus of claim 6, wherein said DC component comprises a luminance portion and a chrominance portion.

8. The apparatus of claim 7, wherein said means for processing comprises means for generating a control value, means for varying said control value, and means for adding the varied control value to said luminance portion of the DC component such that said fade-out effect and said fade-in effect are controlled by varying said control value.

9. The apparatus of claim 8, wherein said means for processing increases the control value from a predetermined minimum value to a predetermined maximum value to achieve said fade-out effect and decreases the control value from said predetermined maximum value to said predetermined minimum value to achieve said fade-in effect.

10. The apparatus of claim 7, wherein said means for processing comprises means for generating a control value, means for varying said control value, means for adding said control value to said chrominance portion of the DC component when a value of said chrominance portion is below a predetermined value and means for subtracting said control value from said chrominance portion of the DC component when said value of said chrominance portion is above said predetermined value, such that said fade-out effect and said fade-in effect are controlled by varying said control value.

11. The apparatus of claim 1, wherein said received compressed frequency components comprise a non-compressed DC component and compressed AC components.

12. The apparatus of claim 11, wherein said means for processing operates upon only said compressed frequency components of said digital video signal to selectively achieve fade-in, fade-out and scene change effects.

13. The apparatus of claim 1, wherein said digital video signal is an image signal.

14. The apparatus of claim 1, wherein said compressed frequency components of said digital video signal are compressed frequency components of a discrete cosine transformed video signal.

15. The apparatus of claim 1, further comprising means for reproducing said processed digital video signal.

* * * * *